July 28, 1936.  F. V. WALTZ  2,049,281
WEIGHING DEVICE
Filed April 13, 1934    5 Sheets-Sheet 1
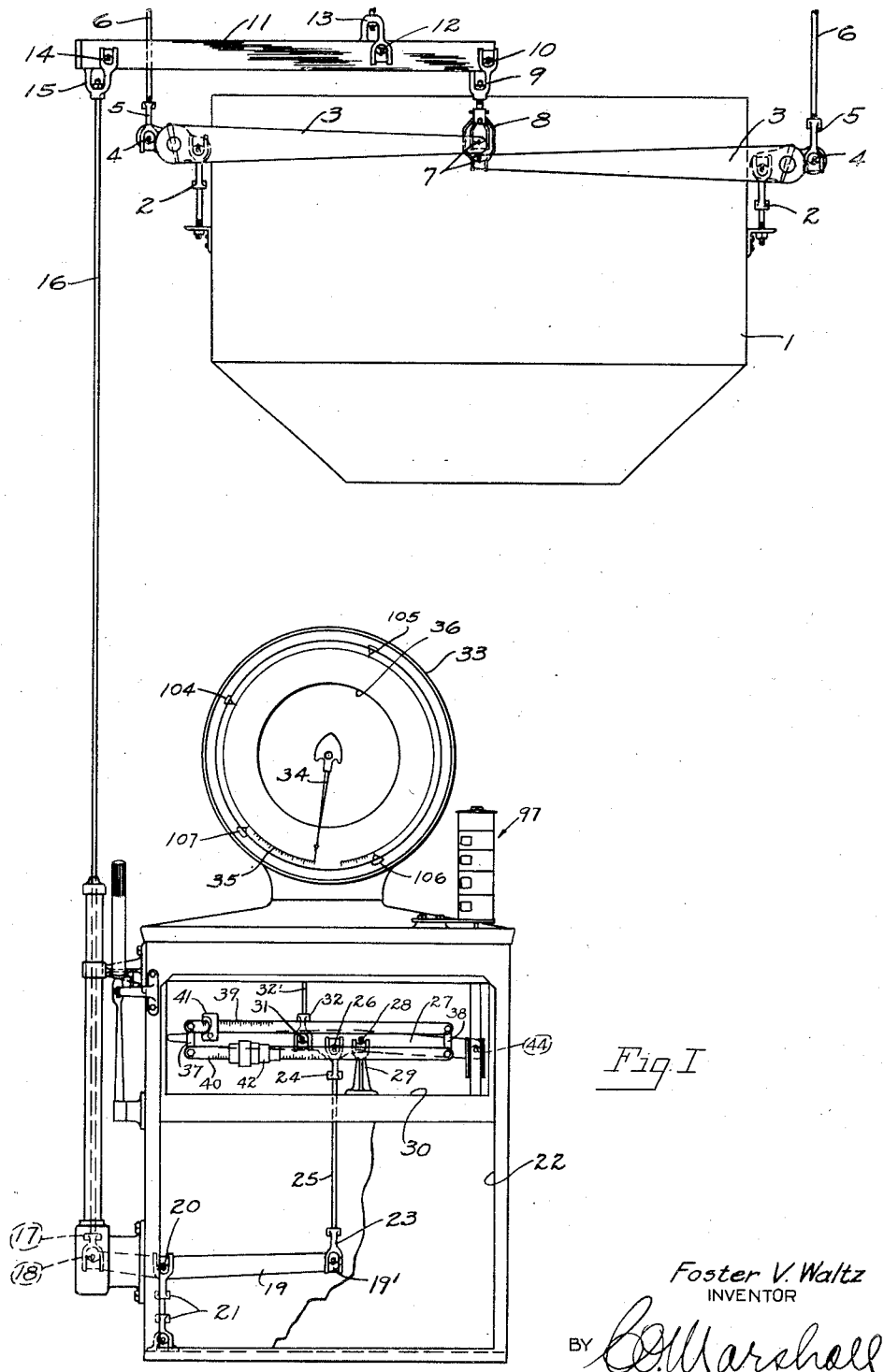
Fig. I
Foster V. Waltz
INVENTOR
BY C. M. Marshall
ATTORNEY

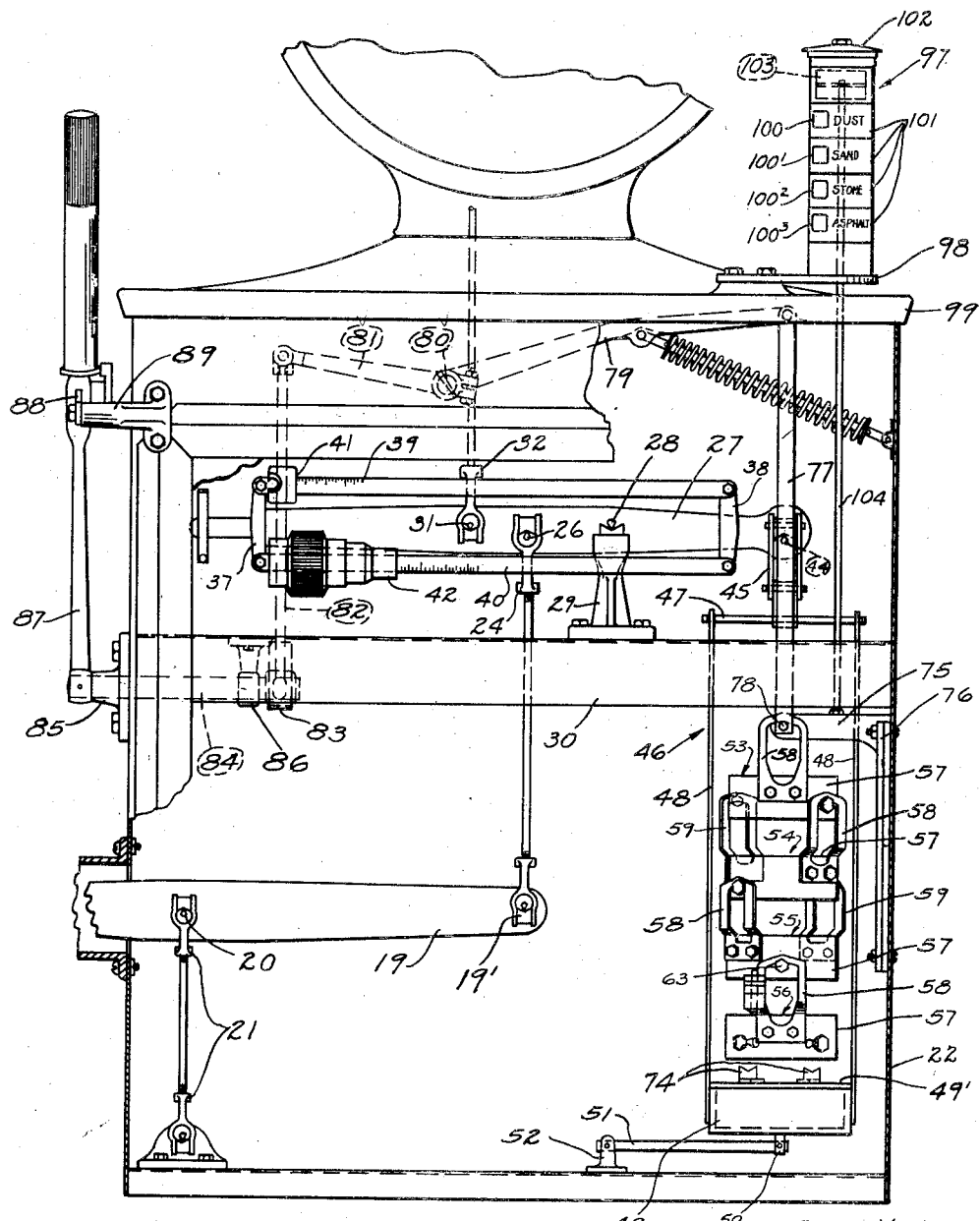

July 28, 1936. F. V. WALTZ 2,049,281
WEIGHING DEVICE
Filed April 13, 1934 5 Sheets-Sheet 3
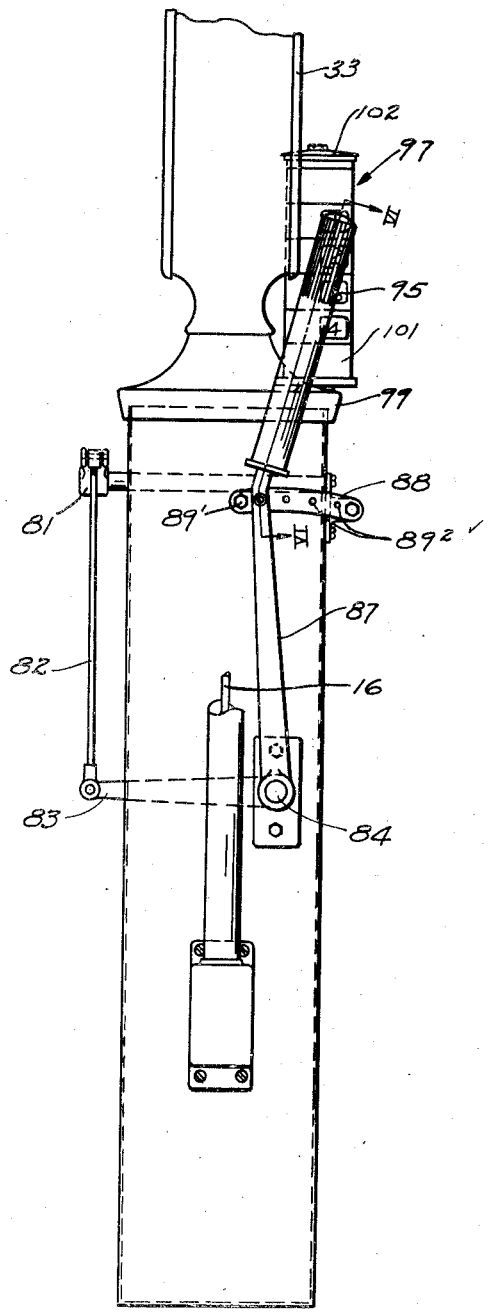
Fig. III
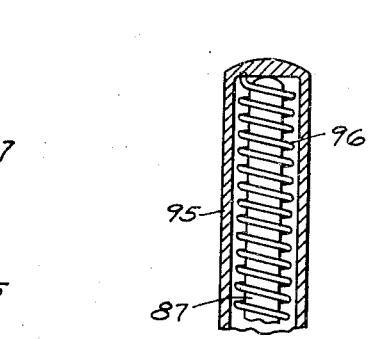
Fig. VI
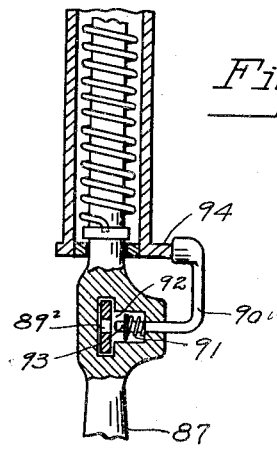
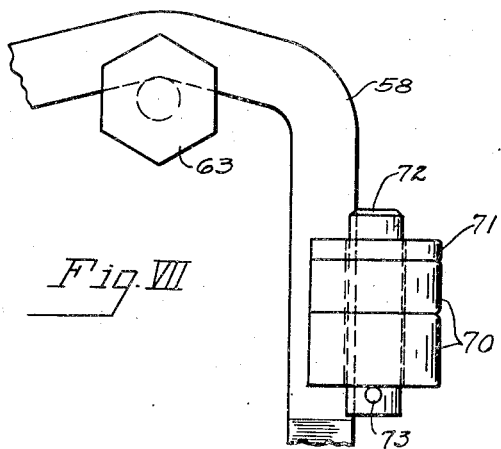
Fig. VIII
Foster V. Waltz
INVENTOR
BY *COMarshall*
ATTORNEY July 28, 1936.  F. V. WALTZ  2,049,281
WEIGHING DEVICE
Filed April 13, 1934  5 Sheets-Sheet 4
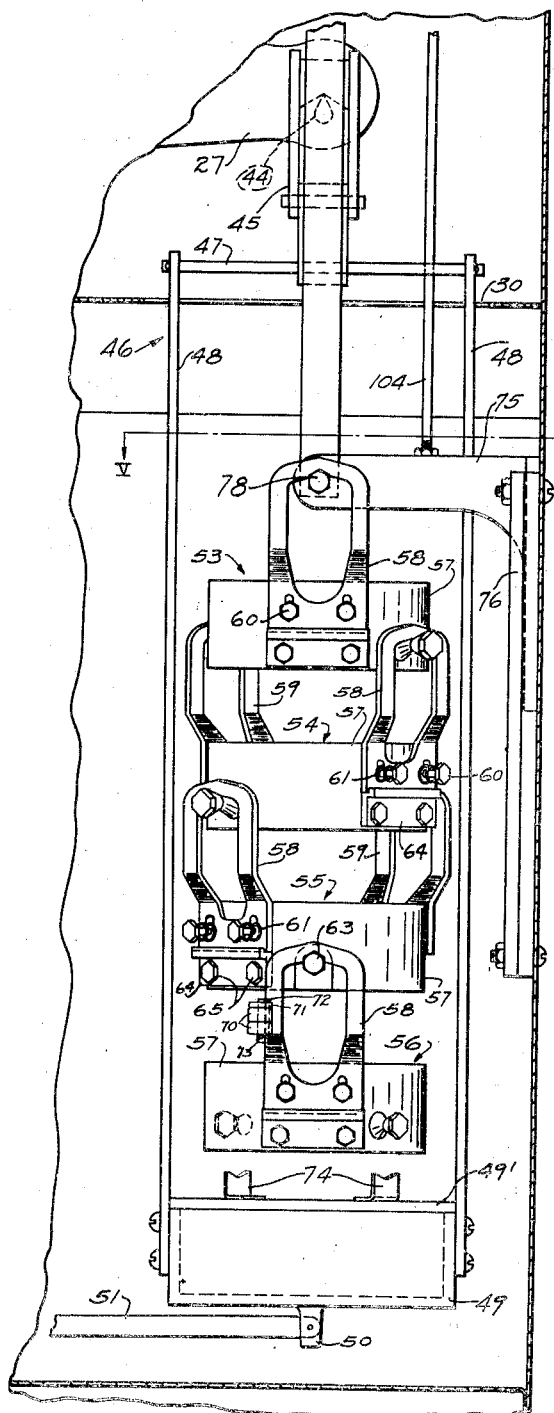
Fig. IV
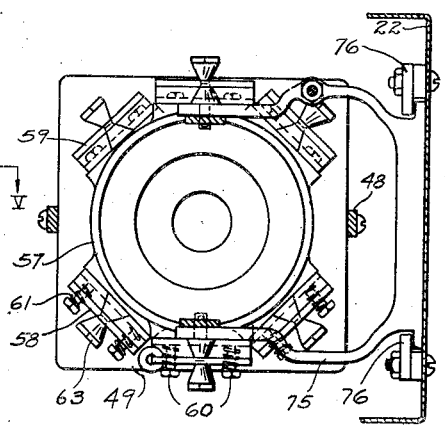
Fig. V
Foster V. Waltz
INVENTOR
BY Marshall
ATTORNEY July 28, 1936.　　　　　F. V. WALTZ　　　　　2,049,281
WEIGHING DEVICE
Filed April 13, 1934　　　　　5 Sheets-Sheet 5
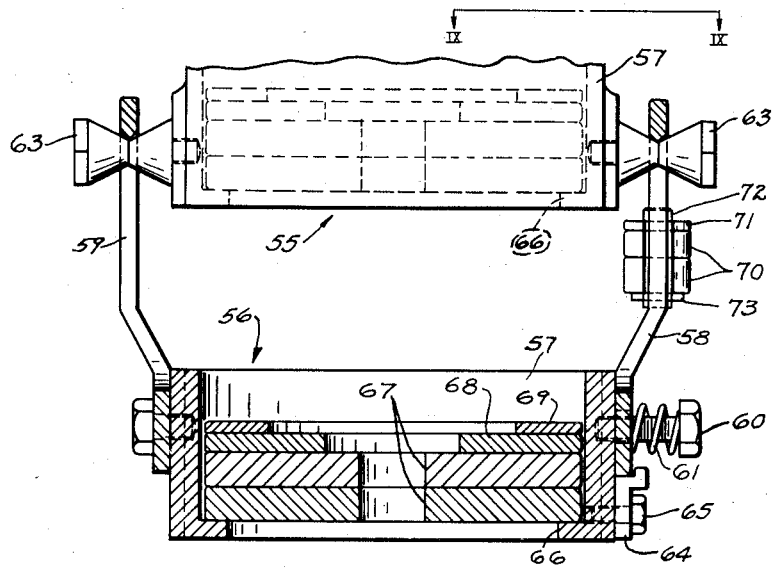
Fig. VIII
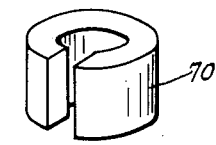
Fig. XI
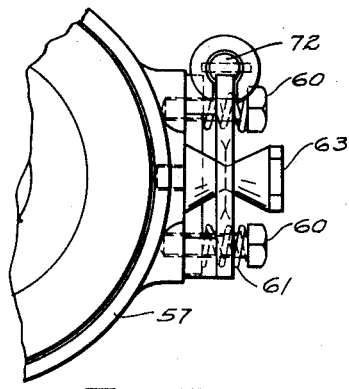
Fig. IX
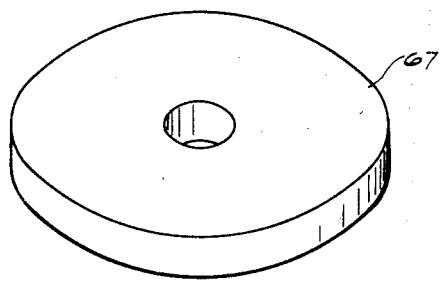
Fig. X
Foster V. Waltz
INVENTOR
BY Marshall
ATTORNEY Patented July 28, 1936

2,049,281

UNITED STATES PATENT OFFICE 2,049,281

WEIGHING DEVICE

Foster V. Waltz, Toledo, Ohio, assignor to Toledo Scale Manufacturing Company, Toledo, Ohio, a corporation of New Jersey Application April 13, 1934, Serial No. 720,427

3 Claims. (Cl. 265—60)

This invention relates generally to weighing devices and more particularly to devices which are adapted to proportion, by weight, the ingredients for batches of concrete, asphalt, furnace charges or similar compounds, the only requisite being that the compound be added in predetermined sequence.

The primary object of my invention is the provision of improved means for selectively varying the counterbalancing effect of its counterbalancing mechanism.

Another object of the invention is the provision of improved means, in a scale of the so-called "unit weight" type, for readily increasing or decreasing the weight of the several unit weights.

Another object is the provision of a unit weight assembly having interchangeable parts, the interchange of which permits obtaining substantially any desired counterbalancing effect.

Still another object is the provision of improved means whereby the unit weights may be given such counterbalancing effect so that loads of different weights may be weighed in any desired sequence; and A still further object of the invention is the provision of improved means for constructing, arranging and combining various elements of the scale mechanism to produce improved results.

These and other objects will be apparent from the following description in which reference is had to the accompanying drawings wherein similar reference numerals refer to similar parts throughout the several views.

Referring to the drawings Figure I is a front elevational view of a device embodying my invention, a portion of the cabinet being broken away.

Figure II is an enlarged front elevational view of the cabinet, a portion thereof being broken away to more clearly show the arrangement of component parts mounted therein.

Figure III is an enlarged side elevational view thereof, showing in detail the operating handle and the arrangement of the unit weight actuating lever system.

Figure IV is an enlarged side elevational view of the unit weight train mechanism, partly in section showing in detail the relation of the unit weights to each other, and the suspension means.

Figure V is an enlarged plan view thereof parts being shown in section on the line V—V of Figure IV.

Figure VI is an enlarged fragmentary, sectional view of the operating handle, the section being taken substantially along the line VI—VI of Figure III.

Figure VII is an enlarged side elevational view of a unit weight suspension loop showing in detail the manner in which fractional loading weights are attached thereto.

Figure VIII is an enlarged fragmentary side elevational view of a unit weight assembly, one of the unit weights being sectioned substantially through its plane of suspension, showing particularly its method of suspension and the manner in which loading weights are placed therein.

Figure IX is an enlarged fragmentary plan view substantially along the line IX—IX of Figure VIII of a unit weight assembly showing in detail the suspension means.

Figure X is an enlarged perspective view of one of the loading weights, employed to vary the counterbalancing effect of a unit weight.

Figure XI is an enlarged perspective view of a somewhat similar fractional loading weight.

Referring to the drawings in detail, the load receiving means which I have shown in connection with my improved counterbalancing mechanism comprise a hopper 1 which is suspended by means of stirrups 2 from a plurality of levers 3. Since these levers are of a well known type, a more detailed description is deemed unnecessary. These levers rest with fulcrum pivots 4 on suitable bearings stationed in stirrups 5 suspended by means of rods 6 from a superstructure (not shown). This superstructure may be of any desired construction, it being necessary, however, that it be rigid and provide an easy access to the hopper for the material to be weighed. The materials employed in batching processes are generally conveyed through chutes from supply bins, the chutes being mounted so that their lower ends discharge such material into the hopper.

The nose ends of levers 3 are provided with power pivots 7 which engage bearings in a shackle 8 secured to the lower end of a stirrup 9 which is suspended from a load pivot 10 fixed adjacent to one end of an extension lever 11. This extension lever 11 is fulcrumed by means of a pivot 12 in a stirrup 13 suspended from the superstructure hereinbefore referred to. From a pivot 14 fixed in the other end of this lever, a stirrup 15 is suspended. This stirrup is engaged by the upper end of a comparatively long connecting rod 16, the lower end of which, terminating in a stirrup 17, engages a pivot 18 fixed in an extending portion of a so-called "shelf lever" 19 which is fulcrumed by the cooperation of pivot 20 and stirrup 21 to the bottom of the cabinet 22. For the purpose of transmitting the pull resulting from the weight of the material in the hopper, this lever 19 engages a suitable bearing 19¹ in stirrup 23. The stirrup 23 forms the lower end of a connecting member which also comprises a rod 25 and a stirrup 24 which engages a load pivot 26 fixed in tare beam lever 27, rockingly mounted with its fulcrum pivot 28 on a fulcrum stand 29, situated on a horizontally disposed shelf 30 within the cabinet 22. In desired spaced relation to the pivots 26 and 28, a power pivot 31 is fixed in the lever 27 and cooperates with a stirrup 32 on a connecting rod 32¹, to transmit the force resulting from a load in the hopper to a load counterbalancing mechanism not shown as it is fully described in U. S. Patent 1,423,660 to H. O. Hem. This load counterbalancing mechanism is disposed within a substantially watch-case shaped housing 33 surmounting the cabinet 22. To indicate the condition of balance of the device, an indicator 34 is attached to a suitable rotating part of the counterbalancing mechanism. This indicator is adapted to cooperate with a series of indicia 35 printed or otherwise marked on a chart 36, fastened to inwardly extending bosses within the housing 33 immediately back of the plane of rotation of the indicator 34.

Arms 37 and 38 which project outwardly from the tare beam lever 27 have graduated beams 39 and 40 bolted to their outer faces. Load offsetting poises 41 and 42 are mounted on these graduated beams respectively. Since the use and the action of such beams and poises are so well known no further description of their function will be given.

For the purpose of supporting one or more unit weights, in effective position, a pivot 44 is fixed in the end of the lever 27. This pivot is engaged by a loop like stirrup 45 (Figure II) from which a frame like member 46 is suspended; this member 46 comprises a horizontally disposed yoke 47 secured to the lower end of the stirrup 45. Rods 48 depending from the yoke 47 have a unit weight support 49 fastened to their lower-ends. This unit weight support is preferably in the form of a receptacle so that it may receive sufficient loading material to counterbalance the dead weight of the mechanism. This support is covered by a plate or platform 49¹. To prevent the support 49 from swinging freely and thus setting up detrimental vibratory movements in the scale mechanism, a post 50 dependingly studded into its bottom is pivotally engaged by one end of a check line 51, the other end thereof pivotally engages a bracket 52 fixed in a perpendicular plane passing through the fulcrum pivot 28 of the tare beam lever 27. Since the horizontal distance between the pivotal points of the check link 51 is equal to the distance between the axes of the fulcrum pivot 28 and the pivot 44 a slight "out of plumb" condition of the frame 46, if the cabinet is in an unlevel position, will not affect the accuracy of the weighing when the unit weights are resting thereon.

The variable unit weights 53, 54, 55 and 56 are generally of the type shown in U. S. Patent 1,423,-660 to H. O. Hem with the exception of certain improvements and modifications. Each unit weight comprises a hollow shell 57 preferably tubular in shape, having suspension loops 58 and 59 fastened to diametrically opposite faces; loop 59 is fixedly bolted to the shell while loop 58 is retained by the cooperation of bolts 60, (see Figure VIII) which extend through apertures in the loop 58, compression coils 61 and are threaded into the shell 57. The compression coils 61 are positioned between the under side of the head of the bolt 60 and the outer face of the suspension loop 58 and thus frictionally hold the loop 58 immovable with reference to the shell but permit it to be pulled back in a hinging like motion so that the unit weight may be detached from hour-glass shaped studs 63 extending from opposite sides of the unit weight immediately above. Since the apertures in the loop 58, through which the bolt 60 passes must be vertically elongated to obtain the hinging action mentioned above, a shelf like strip 64 is secured to the shell 57 by bolts 65 immediately below the lower edge of the loop to prevent its displacement.

The hollow unit weight shells 57 are provided with inwardly projecting rims 66 along their lower edges. These rims are intended to support disc like weights 67, 68 and 69 when placed in the interior of the shells. These disc like weights are so calculated and designed that the counterbalancing effect of the unit weight may be adjusted to counterbalance loads of predetermined amounts. Smaller increments of load counterbalancing effect may be added in the form of C shaped weights 70 and 71; these are adapted to partly encircle a pin 72 fastened to a vertical edge of the suspension loop 58 (see Figure VII), and to rest on pin 73 extending transversely through the aforementioned pin 72.

The unit weights are also provided with hour-glass shaped studs 63, extending horizontally from diametrically opposite faces. Notched lugs 74 (Figure II) extending upwardly from the cover 49¹ of the unit weight support, are adapted to receive the extending hour-glass studs on the lowermost unit weight and properly position it thereon.

The unit weight 56 which is the lowermost of the train of unit weights, as previously described, is suspended by the loops 58 and 59 from the studs 63 of the unit weight 55 immediately above, which weight is similarly suspended from the next adjacent weight 54 and so on. The uppermost weight 53 is directly suspended from a unit weight guide bracket 75 which is slidably mounted in ways 76, (Figure V) secured to an interior side wall of the cabinet 22. For the purpose of actuating the unit weights, links 77, whose lower ends pivotally engage shoulders on studs 78 fixed in the bracket 75, pivotally engage the end of a lever 79 which is keyed to a shaft 80 extending transversely through the cabinet 22. A lever 81 similarly keyed to the shaft 80, extending in the opposite direction and on the exterior of the cabinet is pivotally engaged by one end of a connecting rod 82, the lower end of which is pivotally connected to a lever 83 keyed to a shaft 84 projecting longitudinally through the left side wall of the cabinet. This shaft 84 is mounted in bearing brackets 85 and 86, the bracket 85 is bolted to the outer side wall of the cabinet and the bracket 86 to the bottom of the shelf 30; a unit weight operating lever 87 is keyed to the end of the shaft 84, which extends through the wall of the cabinet. A rectangular aperture in the handle portion of the lever surrounds a segment 88 which is fastened at one end to the cabinet 22 with the aid of bracket 89 and with a cylindrical stud 89¹ on the opposite end. To retain the lever 87 in desired position, spaced apertures 89² in the segment 88 are provided to receive the end of a C shaped latching member 90 (Figure VI). The normal bias of a spring 91, which is seated in a cavity 92 of the handle 87, encircling a portion of the C shaped member and pressing against a pin 93 extending transversely therethrough constantly forces the end of the member 90 into contact with the face of the segment and into one of the apertures 89² when in registration therewith.

In changing the position of the operating lever 87 to actuate the unit weights, a cam-like projection 94 secured to the lower end of a tubular handle 95, which turnably surrounds the upper portion of the operating lever 87, engages a face of the C shaped member 90 and forces this outwardly, when the tubular handle 95 is turned, thus drawing the other end out of the aperture 89² in the segment 88 in which it was positioned. When the lever has been moved and the unit weights repositioned, release of the tubular handle 95 permits a helical spring 96, in its interior, to revolve it, disengaging the cam-like projection from the face of the C shaped member, permitting the spring 91 to force its other end into the aperture with which it is in alignment.

To enable the operator of the device to tell at any time during a batching operation just what materials have been weighed into the bins an indicating device 97 is fastened on a plate 98, bolted to a cover 99 of the cabinet 22. This indicating device comprises a vertically disposed tube in which a number of rectangular openings 100, 100¹, 101², 101³ are cut. A number of interchangeable sleeves 101 provided with similar openings loosely surround the tube so that the openings in the sleeves and the tube may be aligned. A cover 102 which is threaded on the tube is adapted to clamp the sleeves 101 in position. A piston 103, fastened to the end of rod 104 which is threaded into the unit weight operating bracket 75, partakes of its movement and being positioned back of one of the apertures 100, 100¹, 100² and 100³ visibly indicates the ingredients the device has counterbalanced, the names of which are painted on the sleeves 101, 101¹, 101² and 101³.

Let us assume it is desired to weigh out the necessary quantities of components for a batch of asphaltic pavement material in which the following amounts of ingredients are required: limestone dust 762 pounds, sand 1195 pounds, stone 1960 pounds and asphalt 484 pounds; and we will also assume in this example that the automatic weighing capacity of the scale, that is, the amount of material which can be counterbalanced by the mechanism and automatically indicated on the chart 36 is 2000 pounds, and that each unloaded unit weight shell is capable of counterbalancing 500 additional pounds of material.

The first step is to set markers 104, 105, 106 and 107 in registration with the corresponding weight indicia on the dial. These markers are interchangeable and may also have the name of the different ingredients marked thereon. Since their construction and application is fully explained in the U. S. Patent 1,663,983 to C. H. Hapgood, they are not described herein in greater detail.

The next step is to adjust the unit weights so that their counterbalancing effect is of the required magnitude. The first ingredient to be weighed into the hopper, we will assume, is limestone dust of which 762 pounds are required. Unit weight 56 which is the lowermost of the train is taken out by pulling the loop 58 outwardly against the pressure of the spring 61. This permits the weight to be disengaged from the hourglass studs of the weight 55 from which it was suspended and it may then be taken out of the cabinet.

Since the shell has a counterbalancing effect of 500 pounds but 762 pounds are to be counterbalanced therewith, two disc weights 67 are placed in its interior so that they rest on the rim 66. These weights each have a counterbalancing effect of 100 pounds. A weight 68 having a counterbalancing effect of 50 pounds is then added, and on top of this weight 69 is placed; this has a counterbalancing effect of 10 pounds making a total of 760 pounds. Since, however, 762 pounds are required, two 1 pound fractional weights 70 are slipped over the pin 72 which is secured to the edge of the loop 58, increasing the counterbalancing effect to the required amount.

Unit weight 55 is then removed from the cabinet in the same manner and similarly loaded with disc weights until it is given a counterbalancing effect of 1195 pounds. Unit weights 54 and 53 are also removed and loaded so that they have counterbalancing effects of 960 pounds and 484 pounds respectively. These weights are then replaced as a train in the inverse order in which they were taken out, that is, weight 53 is suspended from the guiding bracket 75 and the other weights suspended therefrom.

The operator now opens a gate mechanism (not shown) which controls the flow of material from the bin in which limestone dust is stored. The material, as it flows from the bin, accumulates in the hopper and exerts an increasing pull on the automatic counterbalancing mechanism located within the housing 33, the indicator 34, being operatively connected to the mechanism revolves in a clockwise direction giving a continuous visual indication, in cooperation with the chart 36, of the number of pounds of material in the hopper.

When the indicator comes into registration with the marker 106 which is set in alignment with the 752 pounds indicium the flow of material is shut off by the operator. The weight of the material in the hopper is then counterbalanced and the indicator returned to its zero position. The operator accomplishes this by moving the handle 87 from its zero position on the segment and positioning the latch in the next aperture. This actuates the system of levers and connecting links, comprising members 87, 84, 82, 81, 79 and 77, and it permits bracket 75 to slide downwardly in the ways 76 a distance sufficient so that the lowermost unit weight 56 is deposited on the support 49 and the other weights from which it was suspended a slightly greater distance so that the suspension loops 58 and 59 of the unit weight 56 do not come into contact with the studs 63 of the next adjacent weight shell 57 during the normal oscillation of the lever 27.

The plunger 103 of the indicating device 97, being directly connected to the bracket 75 is now visible in the opening 100 marked with the name of material, (limestone dust in this example), and thus indicates to the operator that this material has been deposited in the hopper and its weight properly counterbalanced and that the device is ready to determine the next ingredient for the batch. Sand, being the next material, is now fed into the hopper until the indicator 34 registers with the marker 107 which is set in registration with the proper weight indicium. The unit weight 55 placed in its counterbalancing position on the support 49 in the manner hereinbefore described, counterbalances this material and the indicator will again return to register with the zero indicium. These operations are then continued until all the materials, necessary for a batch of asphaltic pavement mixture, are assembled in the hopper 1, which is then unloaded by opening a gate and the materials removed to a mixing device in any desired manner.

When batching material, composed of ingredients which are heavy, bulky and comparatively inexpensive, it is not economical to determine the amount of each with great exactitude, due to the ponderosity of the material feeding and cut-off means which are generally used in handling such material and the high speed at which these operations must necessarily proceed. It is customary, therefore, to establish working tolerances for the weight of each ingredient. When the quantity of ingredient in the hopper is slightly more, or less, than the desired amount, but within the tolerance and the indicator 34 does not register with the zero indicium on the chart 36; when the corresponding unit weight is dropped, the operator may shift either of the poises 41 or 42 on the beams 39 and 40 until the indicator registers with the zero mark on the chart 33 so that the individual errors for each ingredient do not accumulate in the batch and thus result in material which is beyond the limits of the tolerance.

It will be seen that the mechanism described is well adapted to fulfill the objects primarily stated. It is to be understood, however, that the invention is susceptible to variation, modification and change within the spirit and scope of the subjoined claims.

Having described my invention, I claim:

1. In a device of the class described, in combination, weighing mechanism including a plurality of unit weights, each of said unit weights having a pair of diametrically opposed studs, a pair of loop bearings for suspending one of said weights from a pair of such studs on another of said weights, one of said suspension loops on each of said weights being articulated with the weight whereby hinging action may be obtained for disengagement of said loops from said studs, and means for yieldably preventing accidental hinging action of said articulated loop.

2. In a device of the class described, in combination, automatic load counterbalancing mechanism, a plurality of unit weights cooperating with said automatic load counterbalancing mechanism to augment its load counterbalancing effect, said unit weights being substantially tubular in cross section and having inwardly extending projections on their inner walls adapted to receive weights to increase their augmenting effect, a pair of studs extending horizontally from said unit weights, and a pair of vertically extending loops fastened to each of said unit weights and adapted to engage studs on another of said unit weights, one of the loops of a pair being fixedly fastened to the unit weight and the other of said loops being hingedly fastened to the unit weight.

3. In a device for determining the varying amounts, by weight, of the serial ingredients for a batch of material, in combination, weighing mechanism comprising automatic load counterbalancing means, means for indicating the weight of a load counterbalanced by said automatic load counterbalancing means in cooperative relation thereto, a chain of unit weights adapted to be applied on a fixed axis of said automatic load counterbalancing means, each of said unit weights being capable of counterbalancing the amount of one of the ingredients of such batch, means for applying said unit weights to said fixed axis of said load counterbalancing means in predetermined sequence and means incorporated in each of said unit weights for receiving additional unit weights for selectively changing the counterbalancing effect of said unit weight, and indicating means comprising a tubular member, vertically disposed, having openings therein along the longitudinal axis thereof, a piston within said tubular member and means directly connecting said piston and said means for applying said unit weights whereby said piston is visible through a different opening in said tubular member upon the application of each of said unit weights.

FOSTER V. WALTZ.